United States Patent
Danley et al.

(10) Patent No.: US 9,205,609 B1
(45) Date of Patent: Dec. 8, 2015

(54) LASER CUTTING AND POLISHING METHODS FOR OPTICAL FIBERS AND FIBERS RESULTING

(71) Applicants: Jeffrey Dean Danley, Hickory, NC (US); Kevin Eugene Elliott, Horseheads, NY (US); Darrin Max Miller, Hickory, NC (US)

(72) Inventors: Jeffrey Dean Danley, Hickory, NC (US); Kevin Eugene Elliott, Horseheads, NY (US); Darrin Max Miller, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 412 days.

(21) Appl. No.: 13/714,472

(22) Filed: Dec. 14, 2012

Related U.S. Application Data

(60) Provisional application No. 61/661,771, filed on Jun. 19, 2012, provisional application No. 61/578,868, filed on Dec. 21, 2011.

(51) Int. Cl.
*G02B 6/34* (2006.01)
*B29D 11/00* (2006.01)
*G02B 6/25* (2006.01)

(52) U.S. Cl.
CPC ............ *B29D 11/00663* (2013.01); *G02B 6/25* (2013.01)

(58) Field of Classification Search
CPC ........................... B29D 11/00663; G02B 6/25
See application file for complete search history.

(56) References Cited

U.S. PATENT DOCUMENTS

| | | | |
|---|---|---|---|
| 4,147,402 A | 4/1979 | Chown | 350/96.18 |
| 4,345,930 A | 8/1982 | Basola et al. | 65/102 |
| 4,510,005 A | 4/1985 | Nijman | 156/221 |
| 4,626,652 A | 12/1986 | Bjork et al. | |
| 4,678,268 A | 7/1987 | Russo et al. | 350/96.18 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.68 |
| 5,131,745 A | 7/1992 | Whitney et al. | |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A * | 10/2000 | Feth et al. | 385/97 |
| 6,246,026 B1 | 6/2001 | Vergeest | 219/121.72 |
| 6,282,349 B1 | 8/2001 | Griffin | 385/81 |
| 6,361,219 B1 | 3/2002 | Blyler, Jr. et al. | 385/85 |

(Continued)

FOREIGN PATENT DOCUMENTS

| | | | | |
|---|---|---|---|---|
| WO | 01/61394 A1 | 8/2001 | | G02B 6/26 |
| WO | 01/61395 A1 | 8/2001 | | G02B 6/26 |

(Continued)

*Primary Examiner* — Michelle R Connelly
*Assistant Examiner* — Hoang Tran

(57) ABSTRACT

A method is provided of fabricating an optical fiber having a polished end face, including providing an optical fiber having an axis; positioning and maintaining the axis A of the fiber, at a specific location along the fiber, at a fixed position; and forming a laser processed end face on the individual fiber at said specific location L by irradiating the individual fiber at said location with one or more laser beams while moving the one or more laser beams in a rotational direction around the fiber. The method may be applied to a jacketed fiber and/or a fiber on a reel. Resulting fibers are also disclosed.

5 Claims, 4 Drawing Sheets

(56) References Cited

U.S. PATENT DOCUMENTS

| | | | |
|---|---|---|---|
| 6,413,450 B1 | 7/2002 | Mays, Jr. | 264/1.27 |
| 6,509,547 B1 | 1/2003 | Bernstein et al. | 219/121.68 |
| 6,534,741 B2 | 3/2003 | Presby | 219/121.69 |
| 6,653,592 B2 | 11/2003 | Andersen | |
| 6,696,667 B1 * | 2/2004 | Flanagan | 219/121.72 |
| 6,738,544 B2 | 5/2004 | Culbert et al. | 385/33 |
| 6,742,936 B1 | 6/2004 | Knecht et al. | 385/67 |
| 6,754,416 B1 | 6/2004 | Boyer et al. | |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 7,947,921 B2 | 5/2011 | McFall et al. | |
| 8,052,836 B2 | 11/2011 | Cale et al. | 156/712 |
| 8,101,855 B2 | 1/2012 | Benitez et al. | |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2002/0175151 A1 * | 11/2002 | Ohta et al. | 219/121.69 |
| 2002/0189297 A1 | 12/2002 | Meisser | |
| 2003/0031450 A1 * | 2/2003 | Maher et al. | 385/137 |
| 2004/0003612 A1 | 1/2004 | Ghodbane et al. | |
| 2004/0234211 A1 | 11/2004 | Durrant et al. | 385/88 |
| 2005/0008307 A1 | 1/2005 | Culbert et al. | 385/123 |
| 2005/0232564 A1 * | 10/2005 | Jones et al. | 385/134 |
| 2005/0284852 A1 | 12/2005 | Vergeest et al. | 219/121.67 |
| 2006/0137403 A1 | 6/2006 | Barr et al. | 65/377 |
| 2006/0147157 A1 | 7/2006 | Manning et al. | |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2013/0089294 A1 | 4/2013 | Zimmel | |
| 2013/0319052 A1 | 12/2013 | Bansal et al. | |

FOREIGN PATENT DOCUMENTS

| | | | | |
|---|---|---|---|---|
| WO | 01/61870 | A2 | 8/2001 | |
| WO | WO0161394 | A1 | 8/2001 | |
| WO | WO0161395 | A2 | 8/2001 | |
| WO | WO0161870 | A2 | 8/2001 | |
| WO | 2004/003612 | A1 | 1/2004 | G02B 6/25 |
| WO | 2004003612 | A1 | 1/2004 | |
| WO | 2008/103239 | A1 | 8/2008 | B23K 26/00 |
| WO | 2008103239 | A1 | 8/2008 | |

* cited by examiner

LASER CUTTING AND POLISHING METHODS FOR OPTICAL FIBERS AND FIBERS RESULTING

This application claims the benefit of priority under 35 USC §119 of U.S. Provisional Application No. 61/661,771 filed on Jun. 19, 2012 and U.S. Provisional Application No. 61/578,868 filed on Dec. 21, 2011 the content of which is relied upon and incorporated herein by reference in its entirety.

FIELD

The present disclosure relates to methods of laser cutting and polishing optical fibers and to the resulting fibers, particularly to laser cutting the polishing methods that are well suited to producing both domed or rounded end face surfaces as well as perpendicular flat or angled flat end face surfaces, including off-axis rounded or domed surfaces.

BACKGROUND AND SUMMARY

For optical fibers provided with one or more polished end faces—and potentially also with connectors—at the factory, the mechanical cutting and polishing process is time and material-intensive. Sufficient performance and economies of scale are typically only achieved with bulk processing of many fibers simultaneously, adding to in-process inventory costs, and decreasing the opportunities for custom manufacturing. Accordingly, a generally applicable method for non-contact cutting and polishing of optical fiber is desirable. Some laser-based fiber cutting and polishing methods exist, but typically lack general applicability, being best suited to producing perpendicular flat or angled flat end face surfaces. It is desirable to have a non-contact cutting and polishing method well suited to producing domed or rounded end face surfaces as well as off-axis rounded or domed surfaces.

The present disclosure provides such a method. According to one aspect of the present disclosure, a method is provided of fabricating an optical fiber having a polished end face, the method including providing an optical fiber having an axis; positioning and maintaining the axis of the fiber, at a specific location along the fiber, at a fixed position; and forming a laser processed end face on the individual fiber at said specific location by irradiating the individual fiber at said location with one or more laser beams while moving the one or more laser beams in a rotational direction around the fiber. The method may be applied to a jacketed fiber and/or a fiber on a reel. Resulting fibers are also disclosed.

Variations of the methods and devices of the present disclosure are described in the text below and with reference to the figures, described in brief immediately below.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
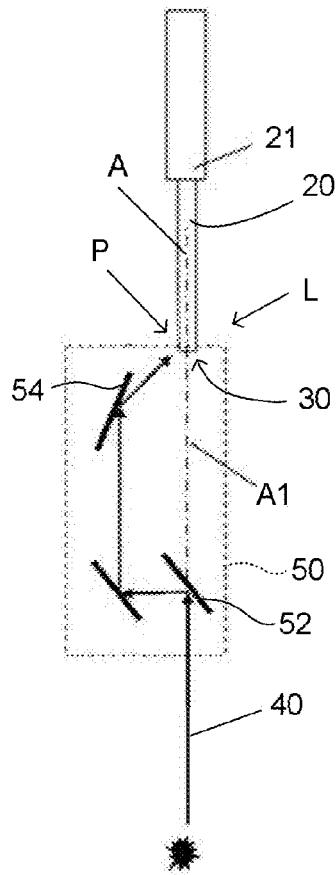
FIG. 1 is a cross-sectional diagram of an apparatus useful in practicing certain methods according to the current disclosure.
Figure 4:
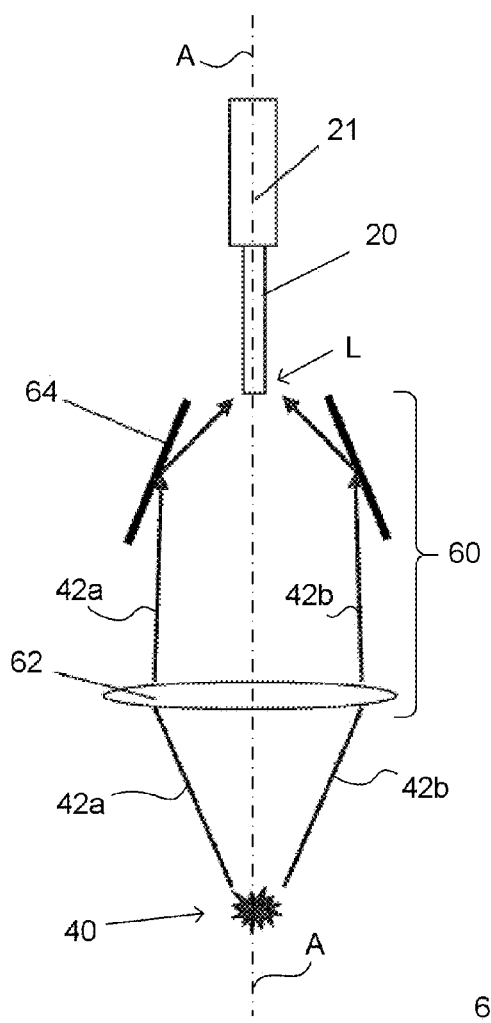
FIG. 4 is a cross-sectional diagram of another apparatus useful in practicing certain methods according to the current disclosure.

According to one aspect of the present disclosure, and with particular reference to FIGS. 1 and 4, a method of fabricating an optical fiber having a polished end face is provided, with the method including the steps of: (1) providing an optical fiber 20 having an axis A; (2) positioning and maintaining the axis A of the fiber 20, at a specific location L along the fiber 20, at a fixed position P; and (3) forming a laser processed end face 30 on the individual fiber 20 at said specific location L by irradiating the individual fiber 20 at said location with one or more laser beams 40 while moving the one or more laser beams 40 in a rotational direction around the fiber 20. The center of rotation may coincide with the axis A, as in the embodiment shown in FIGS. 1 and 4. Alternatively, the axis A of the fiber 20 may be intentionally positioned to be displaced or to be non-parallel with the axis of the optical system A1. It is desirable to move the one or more laser beams completely around the fiber, but according to an alternative embodiment, particularly if more than one beam is used, the one or more beams need not move completely around the fiber.

According to one generally applicable variation of the methods of the present disclosure, the step of providing a fiber comprises providing a jacketed fiber or a fiber on a reel (reel not shown), and, where a jacketed fiber is used, the method further includes stripping the jacket 21 at least from said location L along the fiber 20.

The methods of the present disclosure may also include cutting the fiber 20 at said location L by irradiating the fiber 20 at said location L with said one or more laser beams 40.

Desirably, across all variations of the methods of the present disclosure, the fiber 20 is maintained in a vertical orientation curing laser cutting, if cutting is included, and during forming a laser processed end face 30, such that the end face is oriented downward during and immediately after formation. This aspect of the present methods helps prevent a common drawback of cutting a polishing an optical fiber with a laser or with any heat source: the tendency toward growth of the diameter of the fiber at the end face. This growth can result both from thermally induced expansion of the fiber at or near the end face and from a molten portion of the end face flowing laterally to create a lip or ledge on one or more sides of the fiber. For most applications, the outside diameter of the fiber at the end face or tip thereof is critical to the function and performance of the fiber.

By processing the fiber tip with the tip pointed downward, gravity applies a continuous axial force on the fiber, which minimizes the growth of the fiber in the radial direction due to flowing of the end face 30. Desirably, the laser beam 40 is also swept across the axis A of the fiber 20, rather than always directed on-axis, so that total heat transfer to the fiber may be minimized, reducing any diameter growth due to thermally induced expansion of the fiber.

Figure 2:
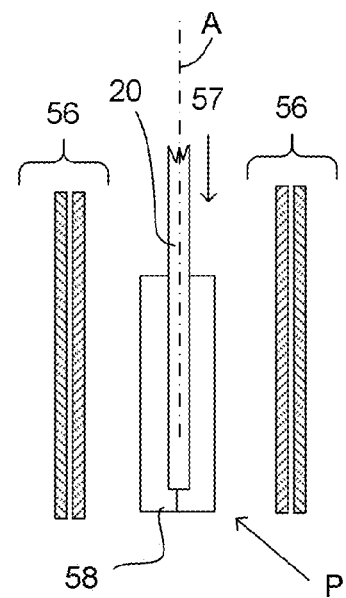
FIGS. 2 and 3 are diagrammatic close-up cross-sections of certain features of the apparatus of FIG. 1.
Figure 3:
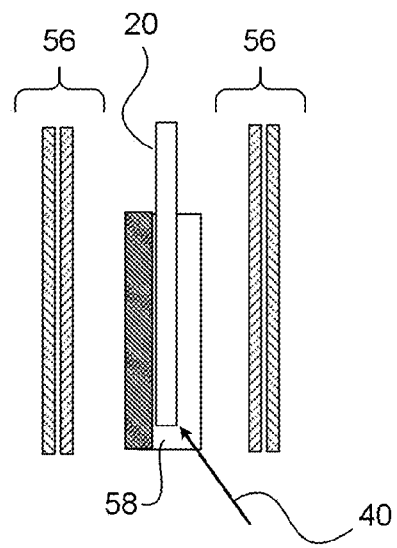

With particular reference to FIGS. 1-3, some aspects of an apparatus are shown for a method of the present disclosure in which a rotating a mirror assembly 50 is rotated around the fiber 20 in order to rotate the beam 40. As shown in FIG. 1, the mirror assembly 50 may comprise a first mirror 52 positioned to receive and redirect a laser beam 40 propagating along the direction of the axis A of the fiber 20 and a second mirror 54 positioned to receive the beam 40, directly or through additional optical components, from the first mirror 52, and to redirect the beam 40 to the individual fiber 20 at said location L.

As shown in FIGS. 2 and 3, which are diagrammatic cross-sectional close-ups of a portion of the apparatus of FIG. 1, the mirror assembly 50 may be mounted on an air bearing system 56 comprising an axial through-hole 57, and the step of positioning and maintaining the fiber 20 may further comprise inserting the fiber 20 through the axial through hole 57. Further, the step of positioning and maintaining the fiber 20 may further comprise maintaining the axis A of the fiber 20 at the fixed position P using a rotating air chuck 58 rotating together with the mirror assembly 50. Thus the air chuck 58 rotates with the beam 40, always supporting the fiber 20 on the side of the fiber 20 opposite the beam 40 (as seen in FIG. 3), while the fiber 20 remains in its position without rotating. This allows for reliable positioning of the fiber 20 relative to the laser beam 40.

Figure 5:
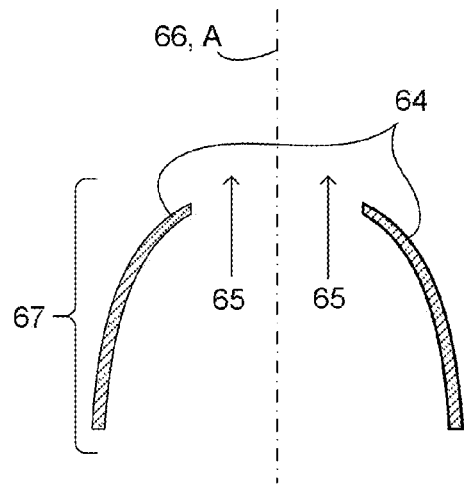
FIGS. 5 and 6 are diagrammatic close-up cross-sections of certain features of the apparatus of FIG. 4.
Figure 6:
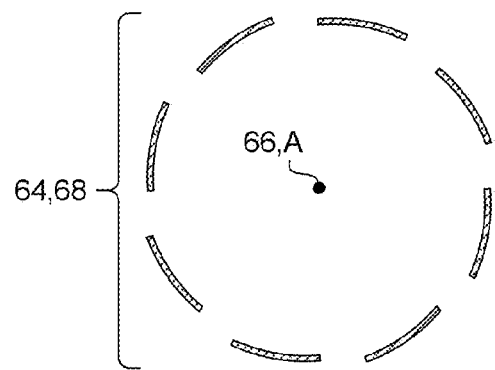

As an alternative to the apparatus of FIG. 1, the apparatus of FIGS. 4-6 may be used to perform steps of the methods of the present disclosure. In particular, using the apparatus depicted in FIG. 4, the step of irradiating may comprise steering a laser beam 40 and guiding the steered beam 42a, 42b to said location L along the fiber 20 through a stationary optical system 60. The stationary optical system 60 may comprises an F-theta lens 62 and a parabolic mirror 64. Suitable angular steering means (not shown) are used for the laser beam 40, such as a galvanometer, for example, or spinning mirror, to steer the beam or beams 42a, 42b through an angular range such as the range corresponding to a circular cone containing the beams 42a and 42b for FIG. 4. The parabolic cross section of the mirror 64 is shown in FIG. 5, with a central opening 65 through which the fiber 20 may extend, and through which the steered beam 42a, 42b may propagate. The axis of the mirror 66 may coincide with the axis A of the fiber 20, as shown or may be different, the effect of which will be explained below.

Figure 7:
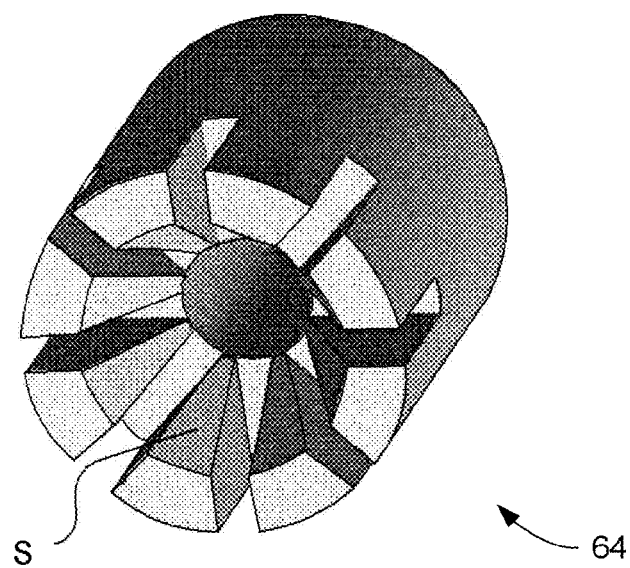
FIG. 7 is a perspective view of the mirror 64 of FIG. 4.

As shown in FIG. 6, as a further option, in addition to the parabolic cross section (in planes parallel to the axis 66) shown in FIG. 5, the mirror 64 may desirably have a stepped profile 68 in planes perpendicular to the axis 66 of the mirror 64. A perspective view of such a mirror 64, machined from a single piece, is shown in FIG. 7. Mirror surfaces S are parabolic in the plane of FIG. 5, but stepped in the plane of FIG. 6. In use, this results in the steered laser beam(s) 42a, 42b being swept across the axis A of the fiber 20, which is desirable to minimize the heat buildup in the fiber, as mentioned above.

Figure 8:
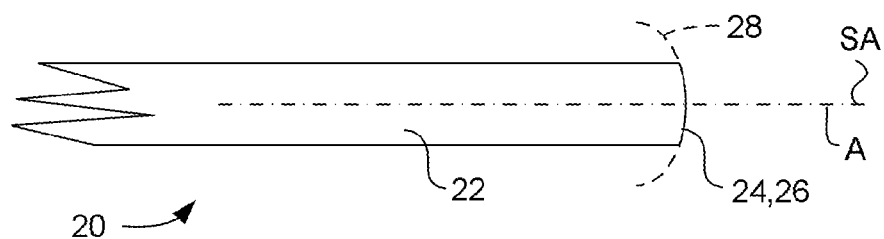
FIGS. 8 and 9 are cross-sectional diagrams of certain fibers producible by methods according to the present disclosure.
Figure 9:
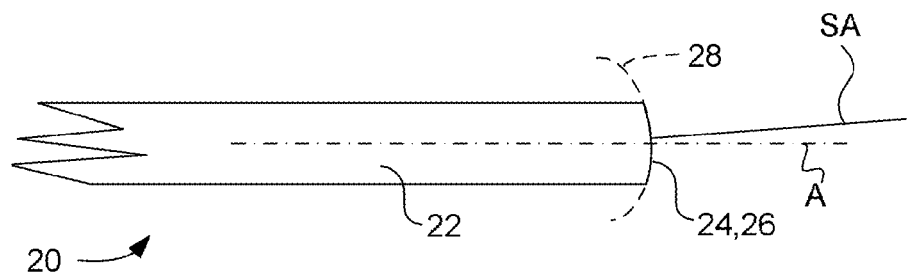

The methods of the present disclosure are particularly suited for producing fibers with end faces as shown in the cross-sectional views of FIGS. 8 and 9. These fibers comprise a cylindrical body 22 having a central axis A and an end face 24, with the end face 24 comprising a laser-processed surface 26, where the surface 26 has a shape defined by an intersection of the cylindrical body 22 with a convex surface of revolution 28. The surface of revolution may be circular or parabolic or dome-shaped or any other desirable type of convex surface of revolution. If desired to produce particular surface shapes, the angle of the laser beam 40 relative to the fiber axis A may even be varied during irradiating, although a fixed angle is preferable for simplicity. The surface 26 may have an axisymmetric shape (around the fiber axis A, with the surface axis of symmetry SA and the fiber axis A coinciding), as in FIG. 8, or may be off center, off axis, or both, as in FIG. 9, in which the surface axis of symmetry SA is both at an angle, and displaced at the surface 26, from the fiber axis A, as desired, depending on the required specification for the end face. The fiber itself may be disposed within a fiber jacket and/or disposed on a fiber a reel, since the surface 26 is formed without need for rotating the fiber 20 itself. Further, because the fiber is optionally cut, and is end face polished, without mechanical contact by a laser-based process, the surface finish of the end face can be extremely good, desirably at least less than or equal to 100 nm rms, more desirably less than or equal to 10 nm rms, even more desirably less than or equal to 1 nm rms. Surface roughness of less than 0.4 nm rms, or even of less than or equal to 0.1 nm rms may also desirably be achieved by these methods.

Figure 10:
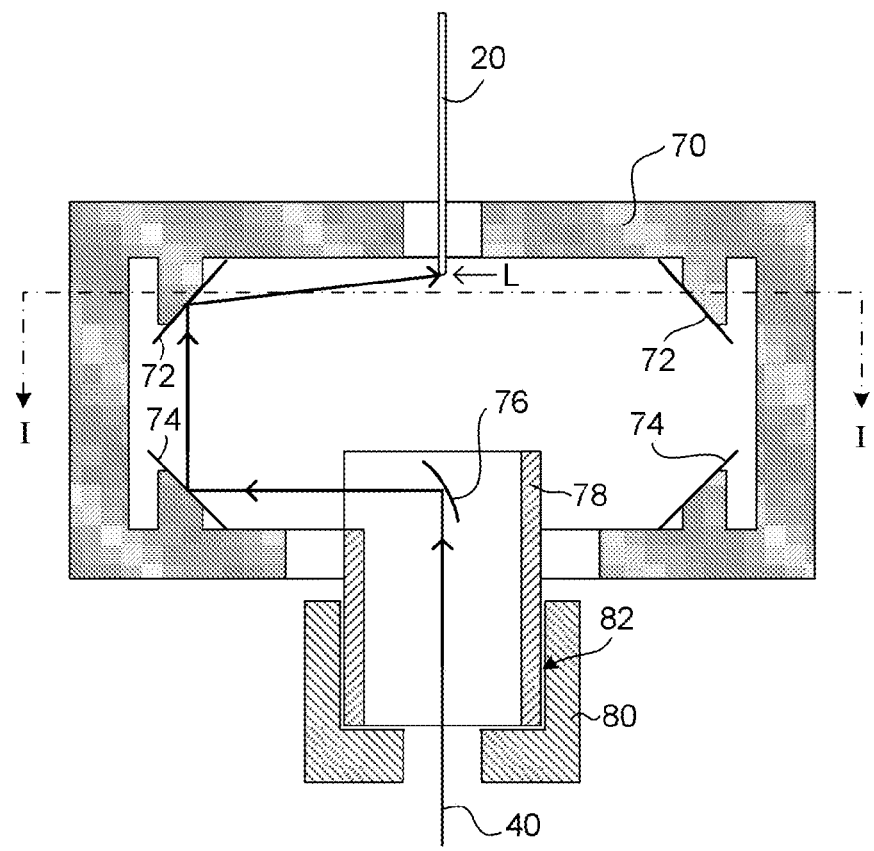
FIGS. 10 and 11 are cross-section diagrams of still another embodiment of an apparatus useful in practicing certain methods according to the current disclosure.
Figure 11:
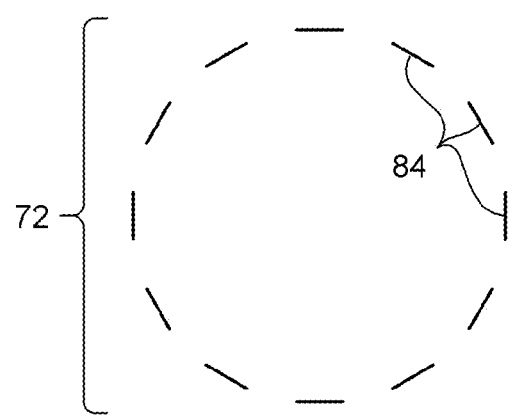

An additional alternative embodiment of an apparatus useful in practicing certain methods according to the current disclosure is shown in the cross-sectional diagrams of FIGS. 10 and 11. In the embodiment of FIGS. 10 and 11, a laser beam 40 is provided together with a rotating mirror 76, which may be in the form of an offset parabolic mirror as shown in this case, to provide focusing of the beam 40 in the direction along the beam path after the mirror 40. The mirror 40 is mounted in a rotating mount 78 held by a supporting structure 80 via an air bearing 82. As the mirror 40 rotates, the beam 40 is directed to at least a first stationary mirror array 72, and from the respective mirrors 84 of the array 72, is directed to the location L at which the end face of the fiber 20 is formed. In the embodiment shown, there is a second stationary mirror array 74 to which the beam 40 is first directed from the mirror 76, and thence to the first stationary mirror array 72, with both arrays supported in a stationary frame 77. As shown in FIG. 11, which is a cross section of the first mirror array 72 taken along the line I-I in FIG. 10, the individual mirrors 84 of the mirror array 72 may desirably be flat mirrors, as also may be the mirrors of the mirror array 74. Thus the beam focusing power of the mirror 76, or of other optics upstream of the mirror 76, is unchanged by the mirror arrays 72, 74, and the beam focus or beam waist can be maintained at or near the location L.

It is noted that terms like "desirably" "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of fabricating an optical fiber having a polished end face is provided, the method comprising:
   providing an optical fiber having an axis;
   positioning and maintaining the axis of the optical fiber, at a specific location along the optical fiber, at a fixed position; and
   forming a laser processed end face on the optical fiber at said specific location by irradiating the optical fiber at said location with one or more laser beams while moving the one or more laser beams in a rotational direction around the optical fiber,
   wherein the step of irradiating further comprises steering a laser beam and guiding the steered beam to said location along the optical fiber through a stationary optical system; and
   wherein the stationary optical system comprises an F-theta lens and a mirror array having a central axis, the mirror array having a parabolic profile about the central axis in planes through the central axis of the mirror array, and having a stepped profile in planes perpendicular to the central axis of the mirror array.

2. The method of claim 1 wherein the step of forming a laser processed end face comprises moving the one or more laser beams in a rotational direction around the axis of the optical fiber.

3. The method of claim 1 wherein the step of providing an optical fiber comprises providing a jacketed optical fiber, or an optical fiber on a reel, and, where a jacketed optical fiber is used, the method further includes stripping the jacket from said location along the optical fiber.

4. The method of claim 1 further comprising cutting the optical fiber at said location by irradiating the optical fiber at said location with said one or more laser beams.

5. The method of claim 1 wherein the step of positioning and maintaining further comprises maintaining the optical fiber in a vertical orientation, and forming a laser processed end face further comprises forming an end face such that the end face is oriented downward.

* * * * *